June 17, 1947.

L. A. MEACHAM

2,422,204

RANGE INDICATOR

Filed June 22, 1943

INVENTOR
L. A. MEACHAM
BY
ATTORNEY

FIG. 2

INVENTOR
L. A. MEACHAM
BY
*G. F. Heuerman*
ATTORNEY

June 17, 1947.   L. A. MEACHAM   2,422,204
RANGE INDICATOR
Filed June 22, 1943   4 Sheets-Sheet 3

INVENTOR
L. A. MEACHAM
BY
G. F. Heuerman
ATTORNEY

June 17, 1947.          L. A. MEACHAM          2,422,204
                        RANGE INDICATOR
                       Filed June 22, 1943          4 Sheets-Sheet 4

INVENTOR
L. A. MEACHAM
BY
ATTORNEY

Patented June 17, 1947

2,422,204

UNITED STATES PATENT OFFICE 2,422,204

RANGE INDICATOR

Larned A. Meacham, Summit, N. J., assignor to Bell Telephone Laboratories, Incorporated, New York, N. Y., a corporation of New York Application June 22, 1943, Serial No. 491,791

7 Claims. (Cl. 250—1.66)

This invention relates to distance measuring and particularly to an electrical range indicator in which the delay interval between the time of radiation of an impulse wave and the time of reception of an echo of the radiated impulse wave, which is reflected from an object the distance or range of which is to be determined, is used in producing a range indication.

In accordance with an embodiment of the invention herein shown and described for the purpose of illustration, there are provided means for generating, during an interval which occurs between the time of radiation of an impulse of a series of impulses from a transmitter and the time of reception by a receiving apparatus of an echo of the radiated impulse from a distant object, a series of alternate positive and negative impulses of brief duration recurring at predetermined equal intervals and means for causing the selection of one of the series of impulses by superposing it upon a pedestal impulse which is started under control of, and coincidentally with, the impulse immediately preceding the selected impulse. Means are provided for varying and measuring the delay interval between the time of radiation of an impulse and the time of occurrence of the selected one of the series of impulses, the indicating means being preferably calibrated in units of distance so that, when the selected impulse is delayed by the required amount to bring it into coincidence with the received echo of the radiated impulse, there is produced an indication of the distance from the impulse radiator and receiver to the object from which the echo is received.

To facilitate the manual adjustment of the apparatus for bringing the selected impulse into coincidence with a received echo, a visual indicating device such as a cathode ray tube is preferably provided. The echo impulse, together with the selected impulse or a range impulse controlled by the selected impulse, are impressed upon the vertical deflecting plates, for example, of the cathode ray tube. The horizontal deflection of the cathode ray beam produced in the cathode ray tube is controlled by a deflecting wave or "precision sweep" which is initiated simultaneously with the starting of the pedestal under control of the impulse which initiates the pedestal. The position of the range pulse is fixed near the center of the screen of the cathode ray tube; and the position of the echo pulse, when the object is stationary and the delay adjustment remains unchanged is also accurately fixed so that "jittering" or "to and fro" movement of the visual indications is avoided when, as is the practice, impulses are radiated and echoes are received in rapid succession. When the object moves, or the delay adjustment is changed, the echo appears to progress smoothly across the screen.

The brief pulses of a high frequency radio wave which are radiated toward an object are produced at intervals under control of starting pulses which may be generated under control of an alternating electromotive force of relatively low frequency, say 400 cycles per second, one starting pulse being produced at about the same point in each cycle of the 400 cycle wave. These starting pulses are also used for controlling the so-called "range unit" constructed in accordance with the present invention. The starting pulses are impressed upon a circuit, called a "start-stop" circuit herein, which generates a square topped voltage wave having a negative portion the duration of which is equal to or preferably greater than the maximum delay occurring between the time of production of a starting impulse and the reception of an echo of the radiated pulse from an object the distance of which is to be measured. During the interval that the square topped impulse produced by the start-stop circuit is positive the start-stop circuit is returned to its stable waiting condition ready to be started again by a succeeding start impulse. This interval is preferably short with respect to the length of the negative portion of the square topped wave so that range impulses may be transmitted in rapid succession. The start-stop circuit employs two electric discharge devices (the electrodes of which may be within a single envelope), the anode of one device being connected through a condenser to the control grid of the second device as in a multivibrator circuit. It has been found that by connecting the anode of the second device to the control grid of the first device directly by a conductive connection instead of connecting the anode to the grid through a condenser as in the usual multivibrator circuit, the recovery time of the circuit is considerably shortened.

A timing wave generator is started due to the abrupt decrease in potential at the start of the negative portion of the square topped wave from the start-stop circuit. The generator frequency is accurately maintained at a constant value so that the period of one cycle will be equal at all times to the predetermined interval required for a range impulse to travel from a radiator to an object a definite distance away and for its echo to return. Quenching of the oscillatory wave produced by the generator is started due to the abrupt rise in potential occurring at the beginning of the positive portion of the square topped wave produced by the start-stop circuit and the generator is designed so that the quenching is completed within the relatively short period of the positive portion of the square topped wave. The timing wave generator is coupled to a phase shifter by means of a phase inverter circuit which provides an accurately balanced low impedance input to the phase shifter and is designed to present an extremely high impedance to the antiresonant circuit of the timing wave generator to which it is coupled. In order to minimize the time requirement for the phase shifter to reach steady state response to each group of timing oscillations, the phase shifting circuit is designed so that it presents a substantially pure resistance load to the output of the phase inverter circuit to which it is coupled. The phase shifting condenser of the phase shifter is an improvement over the condenser disclosed in my United States Patent No. 2,004,613, granted June 11, 1935. It is designed to simplify its manufacture, to provide complete shielding, to avoid use of moving contacts and to obtain satisfactory capacitive balances through inherent mechanical symmetry.

The timing wave is supplied from the output of the phase shifter to an amplifier the output of which is connected to a pulse generator which produces a series of alternate positive and negative sharp pulses, these pulses being accurately spaced by the predetermined interval mentioned. The amplifier is a high gain linear amplifier with negative feedback to present an extremely high impedance to the phase shifter and to avoid drawing an appreciable resistive component of current through the small capacity of the phase shift condenser which would cause distortion of the timing wave. The amplified timing wave is impressed upon an electric discharge device circuit which functions as a cathode follower during positive half cycles of the amplified timing wave, and which device is cut off during the negative half cycles to effectively clip the timing wave along its center line, the negative half of the timing wave impressed upon the input circuit of this "center clipper" being discarded. The clipped timing wave appears with reversed polarity in the plate circuit of this device. An electric discharge device coupled to the center clipper circuit is alternately cut off and turned on again by the square topped portion of the inverted center-clipped wave to produce a series of alternate positive and negative timing impulses. The sharpness of response of the timing pulse generator is improved by providing a delay in the negative feedback of the center clipper to momentarily impart high gain to the center clipper tube at the beginning of each positive half cycle of the timing wave.

The square topped wave from the start-stop circuit is also applied to an RC delay circuit to cause discharge of a capacitance through a resistance which may be varied to change the time constant of the discharge circuit, thereby causing an exponentially rising potential to be applied to the control grid of an electric discharge device. The potential difference to which the capacitance is charged is proportional to the resistance of the variable resistor. The series of alternate positive and negative timing impulses are impressed upon the cathode of the electric discharge device which is maintained, during the intervals between impulses, at a potential which is directly proportional to the initial potential difference to which the capacitance is charged. When the control grid potential of the discharge device has thus been increased sufficiently with respect to the cathode potential, a negative pulse from the timing pulse generator will decrease the cathode potential sufficiently to cause the discharge device to pass space current. A rapid decrease in potential at the anode of the device thus takes place. The time of production of this negative step or impulse is determined by the setting of the variable resistor which controls the time constant of the condenser discharge circuit and also by the phase shift of the series of impulses produced by shifting the phase of the wave from the timing wave generator.

The negative impulse produced at the output of the RC delay circuit controls a circuit for generating a square topped impulse or pedestal and a sweep wave for controlling the horizontal deflection of a cathode ray beam. The pedestal which is initiated coincidentally with a negative pulse from the timing pulse generator is added to the timing pulse with the result that the positive pulse which immediately follows that negative pulse is superposed upon the pedestal. The superposed impulse may therefore be selected and used to perform a desired function. When a cathode ray indicator is used, the selected timing pulse may be impressed on the vertical deflecting means to produce an indication of the range of an object from which an echo pulse is received, the echo pulse also being impressed upon the vertical deflecting means. Instead of applying the selected timing pulse directly to the cathode ray tube for indicating the range, the timing pulse may be used to generate a "step" or "notch" pulse with which the echo pulse may be aligned on the cathode ray tube screen for producing a range indication.

The shaft of the phase shifter condenser which causes the phase of the timing wave to be varied is geared to the shaft of the variable resistor of the RC delay circuit through a step-down gear ratio such that the interval between a starting pulse and the following selected timing pulse may be varied continuously over a range starting from a value near zero to a value corresponding to maximum range. A revolution counter associated with the shaft of the phase shifting condenser is calibrated to indicate the distance to the object from which an echo is received when the selected timing pulse is delayed by such an amount that it occurs simultaneously with the received echo.

If desired, apparatus may be employed for automatically varying the capacity of the condenser of the phase shifter and the variable resistor of the RC delay circuit when the received echo falls out of synchronism with the selected timing pulse to maintain the echo and the selected timing pulse in synchronism. Such an apparatus is disclosed in an application of B. M. Oliver, Serial No. 491,829, filed June 22, 1943.

The invention will now be described with reference to the accompanying drawing in which:

Figs. 2 and 3, when Fig. 3 is placed below

Fig. 4 is a schematic view of a modification of a portion of the apparatus shown in Fig. 3;

Figure 1:
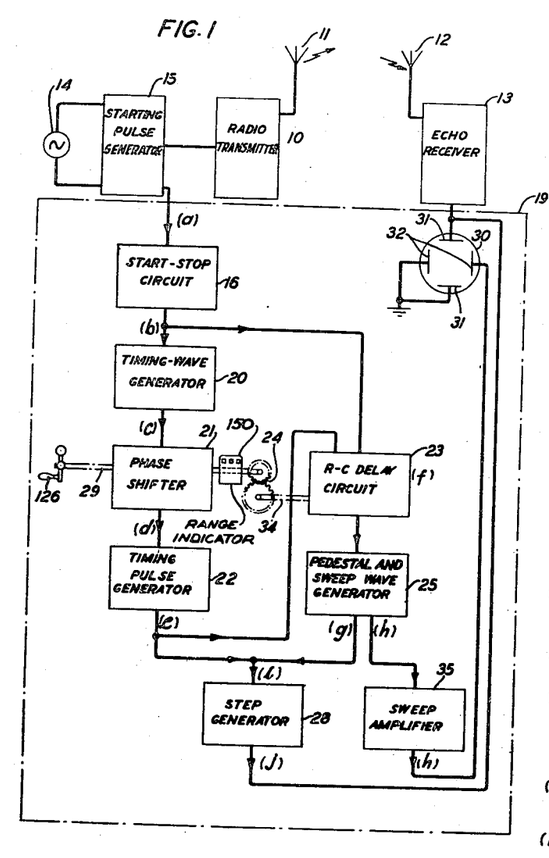
Fig. 1 is a block diagram of a ranging system in accordance with the present invention.
Figure 1A:
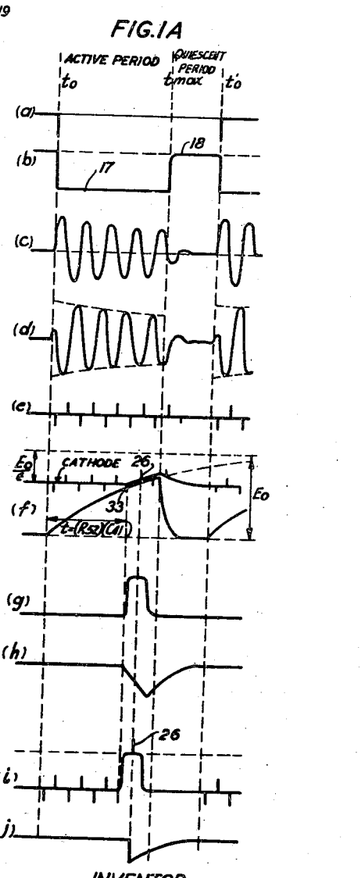
Fig. 1A consists of curves to which reference will be made in describing the invention.

Referring now particularly to Figs. 1 and 1A, there is disclosed a range indicating system in which recurring brief pulses of electromagnetic wave energy produced by a radio transmitter 10 and radiated from an antenna 11 are directed toward an object the distance of which is to be determined and in which the reflected wave impulses or echoes are received by an antenna 12 and detected by a radio receiver 13. An oscillator 14 produces a sinusoidal wave having a period somewhat longer than the time required for a radio wave to travel twice the maximum distance to be measured. Starting pulse generator 15 produces sharp impulses as indicated at a in Fig. 1A at regular intervals, one for each cycle of the sine wave from oscillator 14. It is not essential to the operation of the system, however, that these impulses be produced at regular intervals. The starting impulses which are preferably of very brief duration, say ¼ microsecond, key the radio transmitter 10 to cause corresponding pulses of high frequency radio wave energy to be radiated from the antenna 11.

The starting pulses a are impressed upon the start-stop circuit 16 of a range unit (which comprises apparatus within the area defined by the dash-dot line 19) for generating a square topped voltage wave b. The initial negative portion 17 of wave b is started at the time of a start impulse a, that is at time $t_0$, and has a duration slightly longer than the time required for a radiated wave pulse to travel twice the maximum distance to be measured. The start-stop circuit then recovers its stable waiting condition during a period which is short with respect to its active period during which the negative impulse 17 is produced. The positive portion 18 of the wave b is produced during this recovery period.

If the frequency of oscillator 14 is varied below a certain maximum value, the duration of the negative portion 17 remains fixed, while that of the positive portion 18 varies, above a certain minimum duration for recovery.

The voltage wave b produced by the start-stop circuit 16 is impressed upon a timing wave generator 20 which generates a constant frequency oscillatory wave c the phase of which may be shifted by a phase shifter 21 continuously through a plurality of cycles by turning the handle 126. The phase shifted wave is indicated at d. The period of this oscillatory wave or a phase shift of the wave through a single cycle corresponds to the time interval required for a radiated wave to travel through a certain distance and for its echo to return through that distance. The distance represented by the period of a single cycle of the oscillatory wave is the velocity of propagation of the radiated impulse divided by twice the frequency of the oscillatory wave. The timing wave generator is started by the starting transient at the beginning of the negative portion 17 of the wave b from the start-stop circuit 16 and is quenched due to the stop transient which occurs at the beginning of the positive portion 18 of wave b. The timing wave d from the phase shifter is impressed upon a pulse generator 22 which produces alternate positive and negative timing pulses as indicated at e of Fig. 1A, a pulse being produced at the beginning of each half cycle of the timing wave.

It is desired to produce a pedestal impulse upon which a certain one of the timing impulses may be superposed so that that timing impulse may be selected and used. Means are required for shifting the pedestal with respect to time in synchronism with the shifting of the timing impulses so that one impulse of each series of impulses may be superposed upon the pedestal. There is provided an RC delay circuit 23 having a condenser which is discharged, at a rate determined by the setting of a variable resistor, during the period defined by the portion 17 of the wave b from the start-stop circuit 16. The shaft 34 of the variable resistor of the RC delay circuit is connected through gears 24 to the condenser shaft 29 of the phase shifter 21 so that the change in time constant of the condenser discharge circuit is proportional to the phase shift of the timing wave d and of the timing impulses e. The timing impulses e are also impressed upon the RC delay circuit for accurately fixing the time of generation of the pedestal impulse and the sweep wave.

Figure 7:
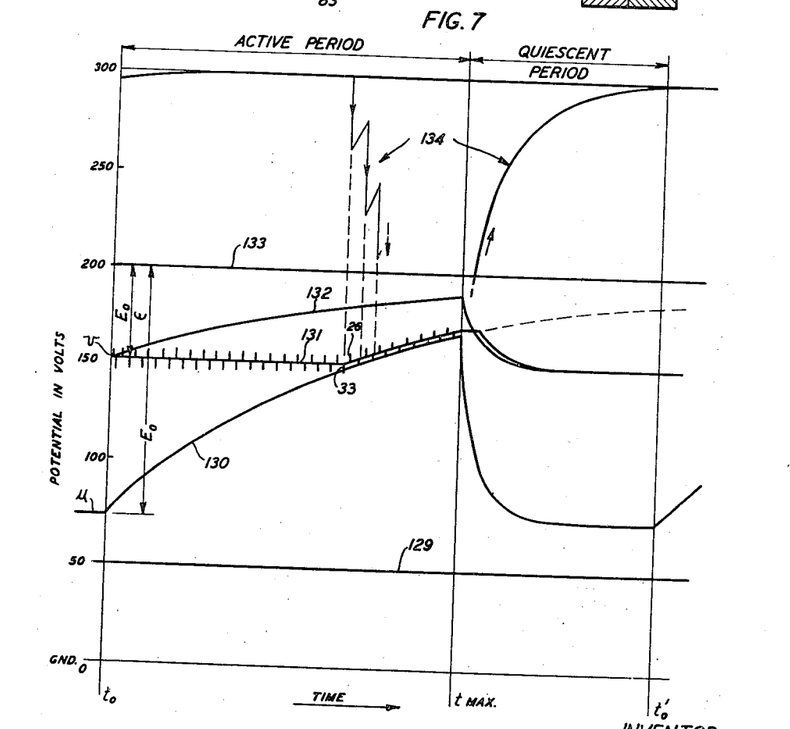
Fig. 7 is a diagram to which reference will be made in explaining the operation of the invention.

A voltage impulse produced at the output of the RC delay circuit as indicated by the curve 134 of Fig. 7, is impressed upon the pedestal and sweep wave generator 25. There is produced by this circuit a pedestal pulse g and a sweep wave h each of which accordingly is started at the time of the negative pulse which immediately precedes the positive pulse which is to be selected for use in producing a range indication. The pedestal pulse g and the pulses e from the pulse generator 22 are combined to cause a certain positive pulse 26 of the timing pulses e to be superposed upon the pedestal 27 as shown at i so that the pulse 26 may be used to produce a range indication. The selected timing pulse 26 may be used directly for range indication or, as shown in Figs. 1 and 1A a "step" impulse j may be produced under control of the selected pulse 26 by the step generator 28. The sweep wave is amplified by an amplifier 35.

The step j and the echo impulse from the radio receiver 13 are impressed upon the vertical deflecting plates 31 of a cathode ray tube 30. The sweep wave h is impressed upon the horizontal deflecting plates 32 of the cathode ray tube. By manually rotating the shaft 29 of the phase shifter condenser to which the shaft 34 of the variable resistor of the RC delay circuit is geared, an echo pulse may be caused to travel along the luminescent screen of the cathode ray tube until it is brought into alignment with the step j. The distance to the object from which the echo is received may then be read from a revolution counter or range indicator 150 attached to the shaft 29, each revolution of the shaft producing an indication equal to a certain fixed distance. As pointed out above, the received echo and the selected timing pulse may also be used, if desired, to control automatic apparatus which causes the shaft 29 to rotate when the distance to an object from which the echo is being received changes so that the changing range of the object can be read from the indicator 150 without requiring manual adjustment of the apparatus.

Figure 2:
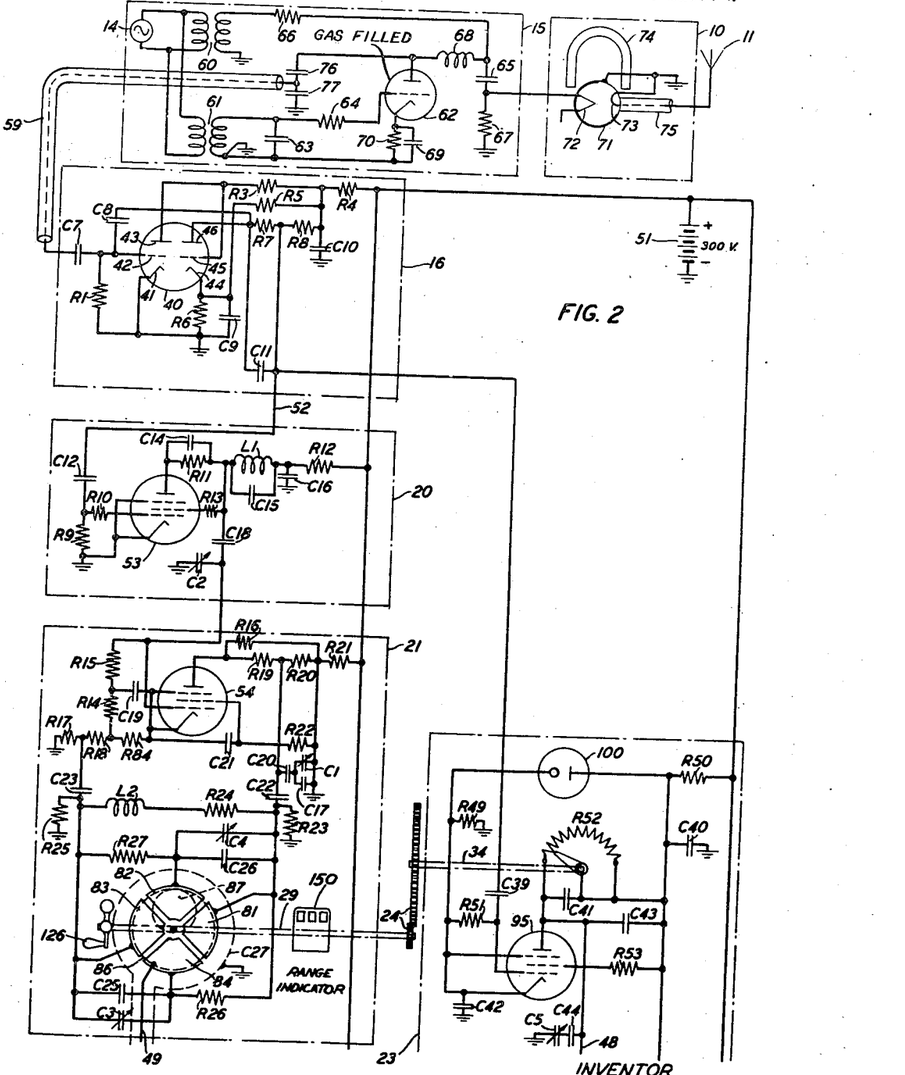
Fig. 2, are a schematic view of a range indicator in accordance with the invention.
Figures 3, 4:
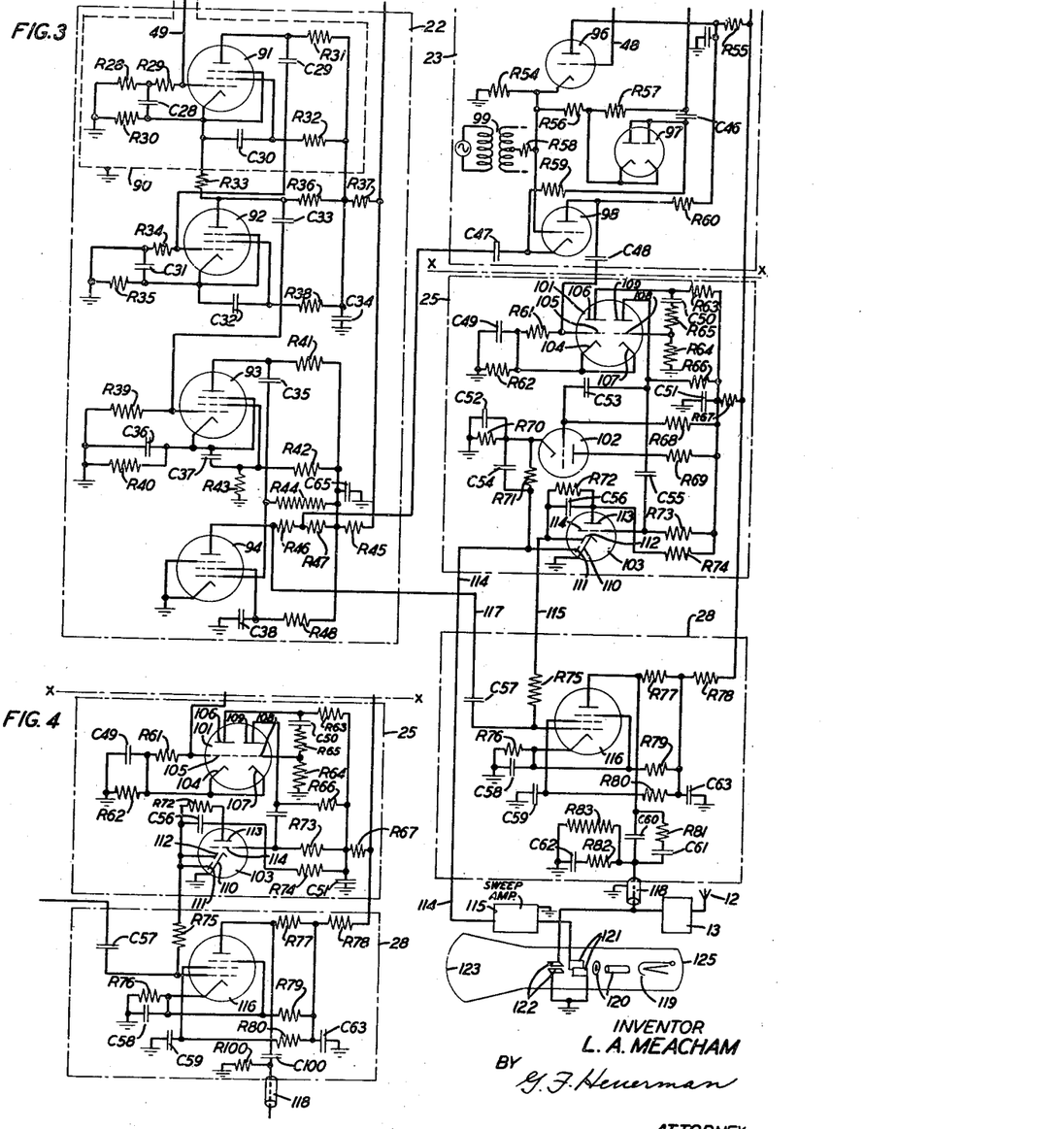
Figure 3:
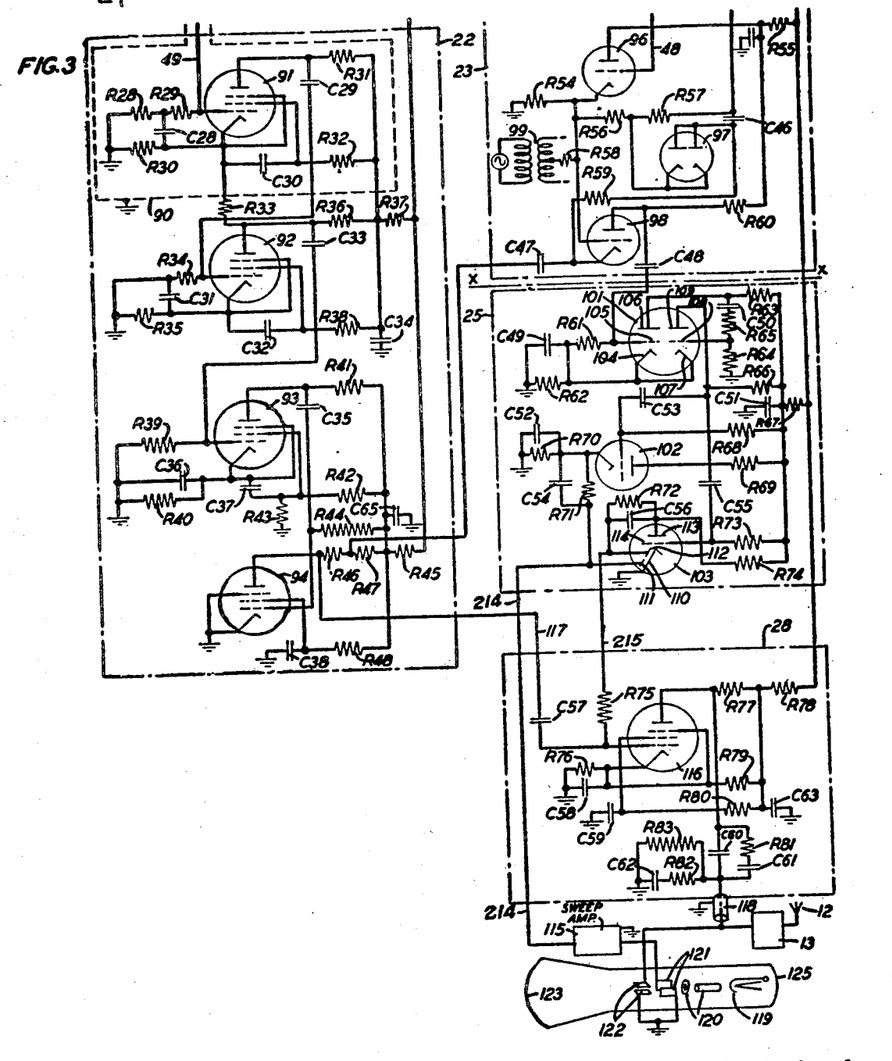

The range indicating apparatus is shown in greater detail in Figs. 2 and 3 when Fig. 3 is placed below Fig. 2. Current from a 400 cycle source 14 is supplied to the primary windings of transformers 60 and 61 of the starting pulse generator 15 employing a gaseous discharge device 62 having an anode, a cathode, and a control grid. Voltage from the secondary winding of transformer 61 is supplied to the control electrode-cathode circuit of tube 62 through a suitable phase shifting circuit comprising a shunt condenser 63, internal impedances of transformer 61, and a protective resistor 64 such that the critical grid voltage required to cause current conduction through the discharge tube is reached when the anode is at or near the positive peak of the voltage wave applied to the anode circuit from the secondary winding of transformer 60. A 500 micro-microfarad condenser 65 is charged through a series circuit connected to the secondary winding of transformer 60 which comprises 1,000 ohm resistor 66 and 1,800 ohm resistor 67. When the critical grid voltage of the tube 62 is reached, condenser 65 discharges through a circuit comprising inductance element 68 of 50 microhenries, anode-cathode path of the tube 62, .024 microfarad condenser 69 having 30,000 ohm resistor 70 connected in parallel therewith and thence through 1800 ohm resistor 67. The condenser 65 is thus quickly discharged (in about ¼ microsecond) sufficiently to cause the voltage at the anode of tube 62 to be reduced and the discharge current through the tube to be interrupted. The radio transmitter 10 comprises a multi-cavity magnetron which may be of the type disclosed in Patent 2,063,342 to Samuel, December 8, 1936, for example. The magnetron comprises an anode 71 which forms an external sheath or enclosure, a cathode 72, a loop 73 and a magnet 74. The anode 71 and one end of loop 73 are grounded, the other end of the loop being connected through a coaxial conductor cable 75 to antenna 11. During the short interval of each cycle of the alternating current source 14 when the gaseous discharge tube 62 is conducting, there is thus impressed between the anode 71 and cathode 72 a high direct current voltage to cause the production of high power, ultra-high frequency oscillations which are picked up by the loop 73 and transmitted through the coaxial conductor line 75 to the directive transmitting antenna 11. A 3 micromicrofarad condenser 76 and a .003 micromicrofarad condenser 77 connected in series between the anode of tube 62 and ground, are also charged by current from source 14 through a circuit comprising transformer 60, resistor 66 and inductance element 68. The discharge of the condensers through the anode-cathode path of tube 62 through the brief interval when the tube is conducting causes a negative starting impulse (a of Fig. 1A) to be impressed upon the coaxial conductor line 59 which transmits the impulse to the start-stop circuit 16.

The start-stop circuit 16 employs an electric discharge device 40 comprising two triodes, the one having a cathode 41, a control electrode 42 and an anode 43 and the other having a cathode 44, a control electrode 45 and an anode 46. Negative starting impulses from the coaxial conductor line 59 are applied through a 10 micromicrofarad condenser C7 across 0.5 megohm resistor R1 which is connected between the control electrode 42 and ground. The cathode 41 is connected to ground. The anode 43 is directly conductively connected to the control electrode 45 and the anode 46 is connected to the control grid 42 through a condenser C8 the capacity of which is 50 micromicrofarads when the maximum range to be measured is 20,000 yards. The cathode 44 is connected to ground through 20,000 ohm resistor R6 shunted by .0002 microfarad condenser C9. Anode potential is applied to the anode 43 from the positive terminal of 300 volt battery 51 through series resistors R4 (1,000 ohms) and R3 (0.1 megohm), the negative battery terminal being grounded. Positive voltage is supplied to the anode 46 from source 51 through series resistors R4, R8 (40,000 ohms) and R7 (60,000 ohms). The positive terminal of battery 51 is also connected through series resistors R4 and R5 (60,000 ohms), to the cathode 44. A20 micromicrofarad condenser C11 is connected in shunt with respect to the resistor R7. A 0.1 microfarad condenser C10 is connected across the series current path comprising resistors R6, R7, R8 and the anode-cathode path from anode 46 to cathode 44.

During the quiescent period of the start-stop circuit 16, the triode 41, 42, 43 is fully conducting with the grid 42 held at the potential of cathode 41 by resistor R1, and the anode 43 is reduced to a low voltage by the passage of anode current through R3. The grid 45 is held at a potential which is actually negative with respect to cathode 44 which is maintained at about +60 volts by the voltage divider R5 and R6. As triode 44, 45, 46 is thus biased below cut-off the anode 46 rests at about +300 volts. The circuit remains stably in this condition until a starting impulse is applied.

The negative starting impulse from the starting impulse generator 15 applied to the grid 42 causes the grid to become negative with respect to its cathode and the current flowing through the discharge path from anode 43 to cathode 41 is decreased. As a result the potential of anode 43 and of grid 45 is sharply increased to produce a negative impulse at the anode 46 due to current flowing through the discharge path from anode 46 to cathode 44, this negative impulse being impressed upon grid 42 by way of condenser C8 to reinforce the starting impulse and thus trigger the leading edge of the start-stop wave b. Thereafter the potential of grid 42 rises exponentially toward its asymptote at cathode potential with a time constant of approximately (R1) (C8). The active period of the range unit is determined by the time required for the potential of grid 42 to rise to its cut-off potential. When the grid 42 reaches its cut-off potential the stop transient occurs, the triode 41, 42, 43 becoming conducting and the grid 45 being carried down to its quiescent low potential to make the triode 44, 45, 46 non-conducting. The potential of anode 46 thus rises sharply until triode 41, 42, 43 begins to draw grid current. Thereafter the potential at anode 46 rises somewhat more gradually because condenser C8 is charged exponentially by current passing through R8, R7, C8 and the grid-cathode path of triode 41, 42, 43. As the grid-cathode impedance is low, the recovery time constant is essentially (C8)(R7+R8) which is short compared to the time constant (R1) (C8), so that the circuit may recover its stable waiting condition in a time considerably shorter than its active period. The negative portion 17 of the start-stop wave b which may be about six times (R1) (C8), for example, is produced during the active period while triode 41, 42, 43 is cut off and the shorter positive portion 18 of wave b is produced during the quiescent period when triode 41, 42, 43 is conducting. The shortening of the quiescent time period is believed to be due to the omission of the usual coupling condenser between the anode 43 and the grid 45 so that these elements are directly conductively connected. Condenser C9 is used to prevent cathode feedback which would decrease the gain of the triode 44, 45, 46 during the start transient. Its value is made small so as to hasten the return of the circuit to equilibrium.

The common terminal of the potential dividing resistors R7 and R8 is connected by way of lead 52 to the timing wave generator 20 comprising an oscillatory circuit in the anode current path of an electric discharge device 53, and the timing wave c from the generator 20 is impressed upon a phase inverter circuit of the phase shifter 21, which circuit comprises an electric discharge device 54. The phase inverter circuit is connected to a circuit comprising a variable condenser C27 for shifting the phase of the wave from timing wave generator 20. Each of the electric discharge devices 53 and 54 comprises a cathode, a control grid, a screen grid, a suppressor grid, and an anode. The lead 52 from the start-stop circuit is connected through a 0.1 microfarad condenser C12 and 10,000 ohm resistor R10 to the control electrode of discharge device 53 which is connected through 1 megohm grid leak resistor R9 to the grounded cathode. Positive potential is supplied from the 300 volt source 51 to the anode of tube 53 through 500 ohm resistor R12, through the antiresonant circuit comprising inductance element L1 and .005 microfarad condenser C15 in parallel and through 6,400 ohm resistor R11 and .003 microfarad condenser C14 to the tube anode, the antiresonant circuit being tuned to cause the generation of a 65.57 kilocycle wave during the interval when tube 53 is rendered non-conducting due to the negative portion 17 of the start-stop wave b, Fig. 1A, impressed thereon. A relatively large capacity condenser C15 is used in order that variations of stray capacity may not affect the frequency appreciably. The oscillatory wave is quenched by the low impedance of tube 53, after the positive portion 18 of the start-stop wave raises the grid of tube 53 above cut-off. Positive potential from the 300 volt source 51 is applied to the screen grid of tube 53 through a circuit comprising resistor R12, the antiresonant circuit L1, C15 and 20,000 ohm resistor R13. The inductance L1 and the condenser C15 of the antiresonant circuit are enclosed within a chamber the temperature of which is maintained constant by a suitable temperature controlling apparatus (not shown) so that the frequency of oscillation is maintained constant. The frequency of 65.57 kilocycles was chosen because the period of the wave of this frequency is equal to the time required for a radio wave to travel 5,000 yards, that is, from a transmitting antenna to an object 2,500 yards distant and back to a receiving antenna in proximity to the transmitting antenna. In some cases it will be desirable to choose a timing wave having a different period.

The common terminal of the antiresonant circuit and the parallel circuit comprising elements C14 and R11 is connected through .001 microfarad condenser C18 to the control grid of the phase inverter tube 54. A 100 micromicrofarad variable condenser C2 connected between the control grid of tube 54 and ground is provided to permit a small manufacturing adjustment of frequency of the oscillatory circuit. The 16 microfarad filter condenser C16 is connected from the negative terminal of resistor R12 to ground.

The phase inverter circuit is used to provide an accurately balanced low-impedance input to the phase shifter. It also employs cathode feedback to present an extremely high input impedance to the antiresonant circuit, thus minimizing damping and stray capacitance effects. The anode current path of electric discharge tube 54 may be traced from the positive 300 volt terminal through 1,000 ohm resistor R21, 1,000 ohm resistor R20, 6,000 ohm resistor R19, the anode-cathode path of tube 54, 180 ohm resistor R84, 6,000 ohm resistor R18 and 1,000 ohm resistor R17 to ground. R17 and R20 are equal resistances across which the balanced output voltages appear. R18 is used to increase the amount of cathode feedback for the purpose of obtaining high input impedance and R19 balances the resistance of R18 in the anode circuit. The anode current through R84 produces a voltage drop which is applied to the control electrode for biasing it through a filter formed by .1 megohm resistor R14 shunted by a .001 microfarad condenser C19 and through .5 megohm resistor R15. This arrangement further magnifies the resistance component of the input circuit. Positive voltage from the 300 volt source is supplied to the screen grid through R21 and 0.25 megohm resistor R22. The screen grid is connected to the cathode through .006 microfarad condenser C21 so that the alternating screen grid current flows through the tube without affecting the external anode and cathode circuits. One terminal of resistor R22 is connected through condenser C21 to the cathode and the other terminal of R22 is connected through .5 microfarad condenser C24 to ground. With respect to the alternating timing voltage, therefore, resistor R22 is effectively in shunt with the resistors connected in the circuit between cathode and ground. The resistance of R22 is therefore balanced by the .25 megohm resistor R16 connected between the anode and the common terminal of resistors R20 and R21. Capacitive unbalance of the anode and cathode to ground is corrected by a variable 100 micromicrofarad condenser C1, shunted by 50 micromicrofarad condenser C17, connected between ground and, through .001 microfarad protecting condenser C20 to the anode of tube 54.

The balanced output of the phase inverter is connected through .1 microfarad condensers C22 and C23 to a phase splitting circuit comprising two parallel paths the one path comprising 750 micromicrofarad condenser C26, a 75 micromicrofarad variable condenser C4 being in shunt with C26, connected in series with 3,000 ohm resistor R27, and the other path comprising 3,000 ohm resistor R26 connected in series with 750 micromicrofarad condenser C25, 75 micromicrofarad variable condenser C3 being in shunt with C25. The plate of condenser C22, going to the phase splitting circuit, and the plate of condenser C23 also going to the phase splitting circuit, are connected through 0.1 megohm resistors R23 and R25 respectively, to ground.

The phase shifting condenser C27 (see Figs. 5 and 6) comprises an outer metallic casing 85 and metallic ring stator 86, four metallic stator sectors 81, 82, 83, 84 and a dielectric rotor 87 having a dielectric constant materially different from that of air. The rotor may also be made of metal grounded or insulated from ground, but the dielectric rotor is preferable. The dielectric rotor is mounted on a metallic shaft 29 the bearings for which are provided by the outer casing 85, the latter also providing shielding. The stator members 81, 82, 83, 84 and 86 are supported by insulating members 89 from the casing 85. The ur-phase voltages are supplied to the stator
:tors 81, 82, 83 and 84 which are equal in area
.d shape and are accurately parallel to the ring
itor 86. The casing 85 is connected to a metal-
shield 90 around a first amplifier stage of the
lse generator to which the output of the phase
lfter is connected, the shield being grounded.

Figure 5:
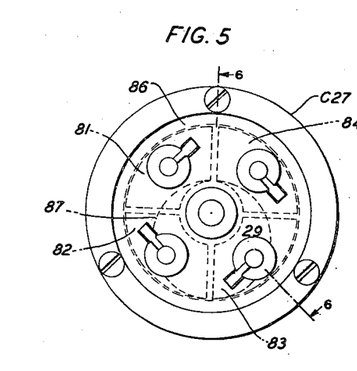
Fig. 5 is a view in elevation of a phase shifting condenser which is used in the range indicator of Figs. 1, 2 and 3.
Figure 6:
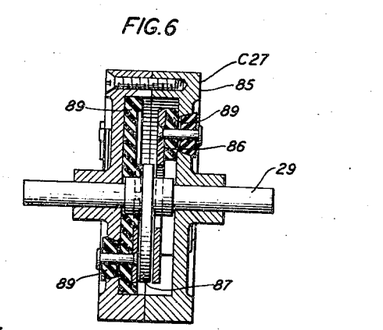
Fig. 6 is a sectional view taken along the line 6—6 of Fig. 5.

It will be seen that the potentials impressed
on opposed stator sectors of the phase-shifting
ndenser are 180 degrees out of phase while the
tentials at any two adjacent sectors are 90 de-
ies out of phase. All four potentials are of
ual amplitude.

If the resistance R26 or that of R27 is equal
R and the capacitance of C26 and C4 in par-
el or that of C25 and C3 in parallel is equal
C then each of the two parallel paths of the
ase splitting circuit satisfies the equation $$R = X_c = \frac{1}{2\pi f C}$$

ere $X_c$ is the capacitive reactance and $f$ is the
quency. The load impedance $Z_1$ presented by
:se elements to the phase inverter circuit, ne-
:cting any small effect of C27 is $$Z_1 = \frac{R}{2} - j\frac{X_c}{2}$$

order to minimize the time required for the
ase shifter to reach steady state responds to
:h timing wave produced during the period
ined by the negative portion 17 of a start-stop
ve, it is desirable to have this impedance a
re resistance. This is realized by connecting
: path comprising inductive element L2 having
inductance of 3.64 millihenries in series with
00 ohm resistor R24 in shunt with the path
nprising C27 and R26 and with the path com-
sing R26 and C25, this added impedance due to
and R24 being equal to the conjugate of $Z_1$,
it is $$\frac{R}{2} + j\frac{X_c}{2}$$

der this condition the load impedance $Z_1$ equals
2 for all frequencies up to a high harmonic
the timing wave, which therefore appears un-
torted on stator sectors 81 and 83. The phase
fted waves on stator sectors 82 and 84 ap-
)ach their steady state condition by way of an
)onential starting transient the time constant
)f which is equal to RC. Since $$R = \frac{1}{2\pi f C}, \quad T = RC = \frac{1}{2\pi f}$$

ich corresponds to one radian of the timing
ve. It is desirable that this transient be short
that the timing wave may be sufficiently ac-
:ate for the measurement of short ranges. The
idenser C1 may be set permanently in manu-
ture so that the over-all calibration of the
ige unit in yards is precisely correct for two
metrically opposed positions of the phase
fter condenser C27 and the range calibration
y be made correct for two angular positions
right angles to the first-mentioned positions
manufacturing adjustment of the trimmer
idensers C3 C4. The accuracy at intermediate
itions of the condenser C27 is dependent upon
: amplitude balance of the voltages on the four
tor sectors and upon the similarity of the four
tions of the condenser C27.

[he ring stator 86 of the phase shifter is con-
:ted by lead 49 to the input of a two-stage am-
fier comprising electric discharge tubes 91 and
and the output of the amplifier is connected to a timing pulse generator circuit comprising
electric discharge tubes 93 and 94. The lead 49
is connected to the control grid of tube 91. Anode
potential is supplied to the tube from the 300 volt
source 51 through 1,000 ohm resistor R37 and
100,000 ohm resistor R31, the cathode of the tube
91 being connected through 500 ohm resistor R30
to ground. Control grid biasing potential is pro-
vided due to the anode current flowing through
R30, which bias is supplied to the grid through
.1 megohm resistor R28 and 2 megohm resistor
R29 in series. A .01 microfarad condenser C28
in a path connecting the cathode of tube 91 to
the common terminal of resistors R28 and R29
by-passes alternating components of the voltage
across R30. Screen grid voltage is supplied to
tube 91 from the 300 volt source through resistor
R37 and through .5 megohm resistor R32. A .01
microfarad condenser C30 is connected between
the screen grid and the cathode. The anode of
tube 91 is connected through .01 microfarad con-
denser C29 to the control grid of amplifier tube
92. Anode voltage is supplied to tube 92 from the
300 volt source through resistor R37 and 20,000
ohm resistor R36 and screen grid voltage is sup-
plied from the 300 volt source through resistor
R37 and 60,000 ohm resistor R38, the screen grid
being connected through .1 micromicrofarad con-
denser C32 to the cathode. Resistor R35 of 180
ohms is connected between the cathode of tube
92 and ground to produce a grid biasing voltage
due to anode current flowing therein, which bias
is supplied to the grid through the .1 megohm
resistor R34. Condenser C31 of .1 microfarad
suppresses alternating components of the voltage
across R35. Negative feedback is provided by
connecting anode of tube 92 through .3 megohm
resistor R33 to the cathode of tube 91. The use
of a large resistor for R29 together with the
negative feedback makes the input impedance of
the amplifier extremely high so that no appre-
ciable resistive component of current is drawn
through the very small capacity of the phase
shifting condenser C27. Displacement of the cen-
ter-line of the timing wave (particularly during
the first few cycles of each train) with the re-
sultant errors in range indications are thus
avoided. Condenser C34 of .5 microfarad is con-
nected between ground and one terminal of re-
sistor R37 to suppress voltage variations of the
300 volt source.

The amplified timing wave voltage at the anode
of tube 92 is impressed through .01 microfarad
condenser C33 upon the control grid of a "center
clipper" tube 93. The control grid is connected
through .1 megohm resistor R39 to ground and the
tube cathode is connected through 10,000 ohm
resistor R40 shunted by .0001 microfarad con-
denser C36 to ground. Anode voltage is supplied
to tube 93 from the 300 volt source through 1,000
ohm resistor R45 and 20,000 ohm resistor R41 and
screen grid voltage is supplied from the voltage
divider formed by resistor R45, .1 megohm resistor
R42 and .1 megohm resistor R43, the screen grid
being by-passed to the cathode through .1 micro-
farad condenser C37. The tube 93 acts as a
cathode follower for the positive half cycles of
the timing wave impressed upon its grid and it
is cut off during the negative half cycles. During
the positive half cycle on the grid when the grid
potential first increases and then decreases, the
anode potential decreases and then increases.
While the tube is cut off the anode potential is
constant. The anode of tube 93 is connected
through .001 microfarad condenser C35 to the grid of electric discharge tube 94, the cathode of which is grounded. Anode voltage is supplied to tube 94 through resistor R45, through 1,000 ohm resistor R47 and through 5,000 ohm resistor R46. Screen grid voltage is supplied to the tube through resistor R45 and .1 megohm resistor R48, the screen grid being connected through .1 microfarad condenser C38 to ground. Condenser C65 (0.1 microfarad) is connected from the negative terminal of resistor R45 to ground. During the quiescent period when no wave is generated by the timing wave generator, the control grid of tube 94 is at a slightly positive potential, the 300 volt source connected through resistor R45 and 1 megohm resistor R44 to the control grid causing a small grid current to flow. During the active period when the timing wave is generated, the change in anode potential of tube 93 causes the grid potential of tube 94 to be sharply increased at the beginning of one half cycle of the timing wave and to be sharply decreased at the beginning of the following half cycle so that tube 94 is made conducting and non-conducting alternately. As a result, a train of square waves with sharp corners is produced at the anode of tube 94, which is connected to the "step" impulse generator 28, and at the common terminal of resistors R46 and R47, which is connected to the RC delay circuit. Differentiation of the square waves produces alternate negative and positive sharp impulses e.

The RC delay circuit comprises four electric discharge tubes 95, 96, 97 and 98. The square-topped wave from the start-stop circuit is impressed upon the control grid of tube 95 through .1 microfarad condenser C39, the control grid being connected to the cathode through 1 megohm grid leak resistor R51. There is provided a current path from the 300 volt source through 8,000 ohm resistor R50, through constant voltage discharge device or cold cathode tube 100 and through 4,000 ohm resistor R49 to ground. The resistance of the constant voltage device changes as the current through it varies to maintain the voltage across the tube constant. A 16 microfarad condenser C40 is connected from the common terminal of resistor R50 and cold cathode tube 100 to ground. The cathode of tube 95 is connected through resistor R49, having .1 microfarad condenser C42 connected in parallel therewith to ground, to maintain the cathode potential at substantially 50 volts positive with respect to ground. During the quiescent periods when the start-stop wave is positive, anode current flows through tube 95 from the 300 volt source, through 8,000 ohm resistor R50, through 200,000 ohm rheostat R52, through the anode-cathode path of tube 95 and through resistor R49 to ground.

A 1,500 micromicrofarad condenser C41 connected in parallel with 150 micromicrofarad condenser C43 and rheostat R52 is thus charged to a voltage equal to the voltage drop across the rheostat which, of course, will depend upon the rheostat setting. A trimmer condenser C5 of 100 micromicrofarads is connected in a circuit from the anode of tube 95 through .005 microfarad protecting condenser C44 to ground to provide an adjustment of the time constant of the circuit (R52)(C41). Screen grid voltage is supplied from the 300 volt source through 30,000 ohm resistor R53. The anode of tube 95 is connected to the control grid of the cathode follower tube 96 having its cathode connected through 20,000 ohm resistor R54 to ground. Anode potential is supplied to tube 96 from the 300 volt source through 1,000 ohm resistor R55. The cathode of tube 96 is connected to the control grid of tube 98 which, in turn, is connected through .1 megohm resistor R58 to the mid-tap of transformer winding 99 which supplies heating current to the cathode heater of tube 96. Anode potential is supplied to tube 98 from the 300 volt source through resistor R55 and 1 megohm resistor R60. The common terminal of R50 and the cold cathode tube 100, which is maintained at substantially 200 volts positive with respect to ground, is connected through 35,000 ohm resistor R57 and 60,000 ohm resistor R56 to the cathode of tube 96. The resistors R56 and R57 are voltage-dividing resistors, the common terminal of which is connected to the cathode of tube 97. The 200 volt terminal of resistor R57 is connected through .002 microfarad condenser C46 to the anode or diode tube 97, which anode is connected through 1,000 ohm resistor R59 to the cathode of tube 98. The initial voltage to which the condenser C41 is charged when tube 95 is conducting, and therefore the initial potential at the anode of tube 95, at the grid and cathode of tube 96 and at the grid of tube 98, is determined by the setting of rheostat R52. Assume that the initial potential at the cathode of tube 96 and at the grid of tube 98 is $E_0$ volts below 200 volts. When tube 95 becomes non-conducting due to the negative portion of the start-stop wave impressed upon its control grid, the condenser C41 and its trimmers will discharge through R52 and the potential at the cathode of tube 96 and at the grid of tube 98 will rise exponentially from its initial voltage toward the 200 volt asymptote. When tube 98 is not conducting, condenser C46 is charged to a voltage equal to the potential across resistor R57 through the anode-cathode path of tube 97, this voltage being $$\frac{35,000}{95,000}E_0 = \frac{E_0}{\epsilon} \text{ (approx.)}$$

where $\epsilon = 2.718$. While tube 98 is non-conducting, therefore, its cathode potential is $E_0/\epsilon$ below the 200 volt asymptote. Timing impulses e from the timing pulse generator 22 are impressed upon the cathode of tube 98 through condenser C47 of 100 micromicrofarads. Condenser C47 and 1,000 ohm resistor R59 provide the necessary differentiating action. When the potential at the grid of tube 98 has increased sufficiently with respect to its cathode potential due to the discharge of condenser C41, a negative timing impulse will lower the cathode potential of tube 98 sufficiently to cause the tube to conduct and the cathode potential will then also rise exponentially due to the change in the charge on condenser C46. The charge on condenser C46 is changed due to current from the 300 volt source flowing through R55, R60, the anode-cathode path of tube 98, R59, condenser C46, R57, R56 and R54 to ground. Thus during an interval which varies with the setting of rheostat R52, the condenser C41 discharges to such a potential that the tube 98 is caused to conduct at the instant that a certain negative impulse from the timing impulse generator is impressed upon its cathode. A sudden decrease in voltage is therefore produced at the anode of tube 98. The operation of the RC delay circuit will be further clarified by reference to the curves of Fig. 7 which will be discussed later.

The pedestal and sweep wave generator 25 comprise electric discharge devices 101, 102 and 103. The device 101 comprises two triodes, the one having a cathode 104, a control grid 105 and an anode 106 and the other having a cathode 107, a control grid 108 and an anode 109. The sharp negative pulse produced at the anode of tube 98 of the RC delay circuit 23 is impressed through 100 micromicrofarad condenser C48 upon the control grid 105 to interrupt the flow of anode current which is supplied from the 300 volt source through 1,000 ohm resistor R67, .1 megohm resistor R63 to the anode 106, the cathode 104 being connected through 20,000 ohm resistor R62 shunted by .1 microfarad condenser C49 to ground. The grid is connected through 5 megohm grid leak resistor R61 to the cathode. The anode 106 is connected through 100 micromicrofarad condenser C50 and 50,000 ohm resistor R65 to the control grid 108. Thus when the anode current is interrupted in triode 104, 105, 106 a positive impulse is impressed upon the grid 108 to cause anode current to flow from the 300 volt source through resistors R67 and R66 (1 megohm), the anode-cathode path and R62 to ground. The triode 107, 108, 109 must remain conducting until the pedestal impulse and sweep wave are completed and therefore the resistor R65 is used in the path between the anode 106 and the grid 108 to block any pulses which may be passed through tube 98 and the triode 104, 105, 106 by way of the plate-to-grid capacitances. Electric discharge tube 102 is a triode having a control grid, a cathode and an anode. Discharge tube 103 has a cathode 110 and anodes 111 and 112, forming two diodes. It also has an anode 113 and a control grid 114 which, with the common cathode 110, form a triode. Anode 109 is connected through 100 micromicrofarad condenser C53 to the grid of tube 102 and through 100 micromicrofarad condenser C55 to the grid 114 of tube 103. When triode 107, 108, 109 is made to conduct its anode voltage drops from plus 300 volts to a low value. The grid of tube 102 and the grid 114 of tube 103, which are normally slightly above cathode potential, are thus carried negative about 150 volts. After the grids of tubes 102 and 103 are thus displaced negatively, the grid potentials rise exponentially toward plus 300 volts due to the charging of condensers C53 and C55 through resistors R68 (1 megohm) and R73 (.25 megohm) respectively, from the voltage drop across R66. The triode 102 and the triode portion of tube 103 are thus made non-conducting due to the negative impulse from the RC delay circuit and, after a short interval, these triodes again become conducting.

Anode current is supplied to tube 102 from the 300 volt source through resistor R67 and .2 megohm resistor R69, the cathode being connected through 50,000 ohm resistor R70 shunted by .0015 microfarad condenser C52 to ground. Anode current is applied to the triode of tube 103 from the 300 volt source through R67 and .1 megohm resistor R74, the cathode 110 being grounded. A horizontal sweep wave for the deflection of a cathode ray beam is produced due to the discharging of condenser C52 through resistor R70 when tube 102 is cut off and due to its subsequent charging caused by the voltage drop across R70 when anode current flows therethrough. The sweep voltage across condenser C52 is impressed through 1 megohm resistor R71 having .01 microfarad condenser C54 connected in shunt therewith, upon the lead 214 going to a sweep amplifier 115. During the quiescent period when the start-stop wave is positive, the lead 214 is stably located at ground potential as required for the sweep amplifier due to the lead 214 being connected to the anode 111 of one of the diodes of tube 103. Similarly, when the triode portion of tube 103 is cut off, its plate potential rises momentarily to produce a square-topped impulse or pedestal $g$ which is impressed through 2 megohm resistor R72 shunted by .001 microfarad condenser C56 upon lead 215 going to the step generator 28. By connecting the lead 215 to the anode 112 of a diode of tube 103, the peak of the pedestal is located at approximately ground potential, the major part of the wave being held correspondingly negative.

The pedestal impulse is supplied through lead 215 and 10,000 ohm resistor R75 to the control grid of electric discharge device 116 of the step generator 28. The timing impulses from the timing pulse generator 22 are also impressed upon the grid of tube 116 by way of lead 117 and 20 micromicrofarad condenser C57. In this case, differentiation of the square wave from the anode of tube 94 is performed by C57 and R75, resulting in the sharp pulses $e$. Anode current is supplied to tube 116 from 300 volt source 51 through 1,000 ohm resistor R78 and 1 megohm resistor R77 to the anode. Current is also supplied from the 300 volt source through the voltage dividing resistors R79 of .1 megohm and R76 of 15,000 ohms, which is shunted by .01 microfarad condenser C58, the positive terminal of resistor R76 being connected to the cathode of tube 116 to maintain it at a positive voltage with respect to ground. Screen grid voltage is supplied from the 300 volt source through resistors R78 and R80 (10,000 ohms), the screen grid being connected through condenser C59 of .0005 microfarad to ground. The negative terminal of resistor R78 is connected through .1 microfarad condenser C63 to ground. The anode of tube 116 is connected, through 5 micromicrofarad condenser C60 and in shunt therewith a circuit comprising 2 megohm resistor R81 and .001 microfarad condenser C61 in series, to a short length of coaxial conductor cable 118 going to a vertical deflecting plate 122 of the cathode ray tube 125. The other vertical deflecting plate and one of the horizontal deflecting plates 121 are grounded. A circuit comprising resistor R82 of 200 ohms in series with 100 micromicrofarad condenser C62 and in shunt with said series circuit a .1 megohm resistor R83 is connected between the coaxial conductor cable 118 and ground. When the tube 116 passes anode current due to the pedestal pulse impressed upon its control grid a sharp negative impulse is produced at the anode of tube 116 and impressed upon the coaxial conductor cable 118, condenser C62 being charged very rapidly to about 10 volts negative with respect to ground. Continued flow of current is limited by means of small by-pass condenser C59 in the screen grid supply circuit and the small coupling condenser C60. Resistor R83 provides a discharge path for the discharge of condenser C62 to form the exponentially rising portion of the step wave $j$. Resistor R81 and condenser C61 in series are connected in shunt to C60 to improve the wave form of the step.

In addition to the vertical and horizontal deflecting plates, the cathode ray device 125 comprises a cathode 119, anodes 120, and a phosphorescent screen 123. At the time that the pedestal pulse $g$ is started the sweep wave $h$ is also started and the latter is impressed upon the horizontal deflecting plates 121 from the output of the sweep amplifier 115. The step wave from the step generator and the echo pulse from the output of the radio receiver 13 are impressed upon the vertical deflecting plates 122 of the cathode ray tube. The step impulse and the echo impulse are thus visually reproduced upon the screen 123 and, due to the echo pulses being received and the step or range impulses being produced in succession at a rate within the period of persistance of vision, the echo indication is stationary upon the screen when the object from which the echoes are received is stationary, and the range impulse or step is always stationary upon the screen. By rotating the shafts of the phase shifter and RC delay circuit by means of a handle 126, the echo indication may be caused to move across the screen until the echo pulse is aligned with the step and the distance to the object may then be read upon the revolution counter, or distance indicator 150, which is calibrated in units of distance.

The circuit arrangement shown in Fig. 4 is a modification of a portion of the range unit which may be substituted for the portion of Fig. 3 below the line X—X. The circuit arrangement is like that shown in Fig. 3 (the corresponding parts being similarly designated) except that the portion of the circuit of Fig. 3 including tube 102 for causing a sweep wave to be generated is omitted, the diode anodes 111 and 112 being conductively connected, and that the condenser C100 of 0.1 microfarad and 1,000 ohm resistor R100 of Fig. 4 are used instead of the circuit comprising elements R81, C61, C60, R83, C62 and R82 for connecting the anode of tube 116 to the coaxial conductor cable 118. The modified circuit of Fig. 4 therefore functions to generate a pedestal $g$ upon which the selected timing impulse 26 is superposed, as shown at $i$, Fig. 1A and for amplifying the selected impulse. The selected pulse or range pulse may be used for some purpose other than that of controlling the deflection of a cathode ray beam as shown in Fig. 3. For example, the range pulse from the coaxial conductor cable 118 in Fig. 4 may be used together with an echo impulse to control a means for automatically causing the rotation of the shafts 29 and 34 of the variable condenser of the phase shifter 21 and of the variable resistor of the RC delay circuit 23 in such manner that the range pulse is maintained in synchronism with an echo impulse. With such an arrangement the range can be read from the range indicator 150 without the need for manual rotation of the shafts by means of the handle 126.

The operation of the system may be better understood from a consideration of the curves of Fig. 7 which show the relationship between voltage and time at several parts of the RC delay circuit 23, in conjunction with the diagram of Fig. 1A. Curve 129 shows the potential at the cathodes of tubes 100 and 95. Curve 130 shows the potential at the cathode of tube 96 and at the grid of tube 98. Curve 131 shows the potential at the anode of tube 97 and at the cathode of tube 98. Curve 132 shows the potential at the cathode of tube 97. Curve 133 shows the potential at the anode of tube 100. Curve 134 shows the potential at the anode of tube 98 which is impressed upon the pedestal and sweep wave generator.

At the time $t_0$, a starting impulse $a$ produced by the starting pulse generator 15 initiates the square topped wave $b$ produced by the start-stop circuit 16 to start the timing wave $c$ produced by the timing wave generator 20. The timing wave in turn causes the generation of the timing impulses $e$ by the timing pulse generator 22. The cathode of tube 95 is maintained at a constant potential of 50 volts positive with respect to ground and the anode of tube 100 is maintained at a constant potential of 200 volts as indicated by curves 129 and 133, respectively. The initial voltage drop $E_0$ across rheostat R52, and therefore the voltage across the capacity in shunt with R52, varies with the rheostat setting. The current through R52 is the anode current of tube 95 which is limited to a safe operating value by the screen grid voltage. The initial potential at the anode of tube 95, the grid of tube 96, the cathode of tube 96 and at the grid of tube 98 is therefore at some value $u$ greater than 50 volts and less than 200 volts depending upon the rheostat setting. When tube 95 is cut off and the condenser C41 discharges, the potential rises from the value $u$ toward the 200 volt asymptote as indicated by curve 130. With $E_0$ variable the cathode potential of tube 98 must be made a function of the range setting. As indicated by curve 131, this potential has an initial value $$\frac{E_0}{\epsilon}$$

below 200 volts and is obtained by means of the voltage divider R56, R57, condenser C46 and diode 97, $\epsilon$ being equal to 2.718 which is approximately equal to the ratio of 35,000 ohms to 95,000 ohms, that is $$\frac{R57}{R57+R56}$$

Condenser C46 is charged through diode 97 to the voltage across R57 and the potential at the cathode of tube 98 is therefore 200 volts minus the voltage to which C46 is charged.

The timing impulses from the timing pulse generator 22 are also impressed upon the cathode of tube 98 as shown by curve 131. After a certain interval equal to the time constant of the condenser discharge circuit comprising rheostat R52 and condenser C41, the grid potential of tube 98 will have increased sufficiently that a negative impulse 33 will cause the tube 98 to become conducting with the result that the potential at the anode of tube 98 decreases sharply as indicated by curve 134.

The cathode potential of tube 97 also rises exponentially as indicated by the curve 132. When tube 98 becomes conducting, anode current from the 300 volt source flowing through tube 98 and resistor R59 charges condenser C46 to cause the cathode potential of tube 98 to rise as shown by the portion of curve 131 which is substantially parallel to the curve 130. At the time $t_{max}$ the grid potential of tube 98 is decreased, due to the positive portion of the start-stop wave $a$ being impressed upon the tube 95 and the flow of space current through tube 98 ceases. Shortly thereafter the potential of the cathode of diode 97 is reduced below the potential of its anode and the diode passes space current until the anode and cathode of the diode 97 are at the same potential. The cathode of tube 98 is thus returned to its initial potential $v$ and the circuit is ready to be started by a succeeding start-stop wave $b$ at the time $t_0'$.

The initial decrease in anode potential of tube 98 as indicated by curve 134 cuts off the triode 104, 105, 106 of the pedestal and sweep wave generator so that the pedestal wave $g$ and the sweep wave $h$ are initiated at the instant that the negative timing pulse 33 occurs so that the following positive timing pulse 26 will be superposed upon the pedestal for producing a range mark as indicated at $i$, Fig. 1A. Each complete revolution of the shaft 29 in one direction or the other shifts the phase of the timing wave in a corresponding direction through one cycle and each of the timing pulses is therefore shifted by an amount equal to the period of the timing wave. Revolving the shaft 29 also varies the setting of rheostat R52 to change the time constant of the condenser discharge circuit at such a rate that the interval between an impulse 33 of each series of impulses which causes the tube 98 to become conducting and the preceding starting impulse may be varied continuously in either direction over a range extending from a value near zero to a maximum value. It is thus seen that the impulse 26 which follows the pulse 33 will be selected to produce a range mark at all times and that the time of occurrence of this range mark may be varied by the rotation of shaft 29, each revolution causing the mark to be produced earlier or later by an interval equal to the period of the timing pulse. Since the distance to the object, represented by the period of a single cycle of the timing wave, is the velocity of propagation of the radiated impulse divided by twice the frequency of the timing wave, it is seen that the indicator 150 may be calibrated in units of distance so that the range to the object may be read when the range impulse 26 occurs in synchronism with an echo pulse received from the object.

What is claimed is:

1. Apparatus for measuring the delay interval between the time of radiation of an impulse of a series of impulses from a transmitter and the time of receiving an echo of said radiated impulse which is reflected from an object to indicate the distance of the object from the transmitter, comprising means for generating during said interval a series of timing impulses of brief duration separated by a predetermined period of longer duration, means for generating in response to one of said series of timing impulses a pedestal pulse so that said pedestal pulse is started substantially coincidentally with said one of said series of timing impulses, means for causing a second of said series of timing impulses immediately following said one impulse to be superposed upon said pedestal, means for selecting said superposed impulse, and means for varying and indicating the delay between the radiated impulse and the selected timing impulse to indicate the distance of the object from the source of radiated impulses when the selected timing impulse is coincident with said echo.

2. In an apparatus for measuring the distance to an object from a radiant energy transmitting and receiving apparatus which transmits radiant energy impulses to an object under control of recurring starting impulses and which receives echoes of the radiated impulses from the object, means for producing under control of each of said starting impulses a series of alternate positive and negative timing impulses, successive similar timing impulses being separated by a predetermined interval corresponding to the time required for a radiated impulse to be propagated to an object at a certain distance and for its echo to return, means under control of one of said timing impulses of each series for causing a succeeding timing impulse of each series of impulses to be selected, means for bringing each selected timing impulse into synchronism with the corresponding echo impulse, and means for indicating the distance to the object when said selected impulses and said received impulses are in synchronism.

3. In an apparatus for measuring the distance to an object from a radiant energy transmitting and receiving apparatus which transmits radiant energy impulses to an object under control of recurring starting impulses and which receives echoes of the radiated impulses from the object, means for producing under control of each of said starting impulses a series of alternate positive and negative timing impulses, successive similar timing impulses being separated by a predetermined interval corresponding to the time required for a radiated impulse to be propagated to an object at a certain distance and for its echo to return, means under control of one of said timing impulses of each series for causing the following impulse of each series of impulses to be selected, means for delaying by varying amounts the interval between a starting impulse and the selected timing impulse of each series for bringing said selected impulses into synchronism with the echo impulses, and means for indicating the distance to the object when said selected impulses and said received echo impulses are in synchronism.

4. In an apparatus for measuring the distance to an object from a radiant energy transmitting and receiving apparatus which transmits radiant energy impulses to an object under control of recurring starting impulses and which receives echoes of the radiated impulses from the object, means for producing under control of each of said starting impulses a series of alternate positive and negative timing impulses, successive similar timing impulses being separated by a predetermined interval corresponding to the time required for a radiated impulse to be propagated to an object at a certain distance and for its echo to return, means under control of one of each series of timing impulses having a certain polarity for causing the following impulse of opposite polarity to be selected from the others of the series of impulses, means for delaying by varying amounts the selected impulse of each series with respect to the starting impulse which precedes it to bring the recurring selected timing impulses into synchronism with the received echo impulses, and indicating means responsive to the setting of said variable delay means for indicating the range of the object when said selected impulses and said received echo impulses are in synchronism.

5. The combination with means for generating and transmitting a first series of separated pulses of energy, of means for receiving a series of pulses which are echoes of said transmitted pulses, means for generating groups of timing pulses, said groups of pulses being generated during intervals following the pulses of said first series respectively, means for utilizing a timing pulse of each of said groups for controlling the selection of a succeeding timing pulse of that group, means for bringing the selected timing pulses into synchronism with said echo pulses, and means for indicating the distance from said transmission means to the location from which said echo pulses are receiving when said selected timing pulses and said echo pulses are in synchronism.

6. The combination with means for generating and transmitting a first series of separated pulses of energy, of means for receiving a series of pulses which are echoes of said transmitted pulses, a generator of timing pulses successive ones of which are separated by a predetermined time interval, means for controlling said timing pulse generator to cause the generation of groups of timing pulses to be started in synchronism with the generation of the pulses of said first series of pulses and to cause each group of timing pulses to end before the next pulse of the first series is transmitted, means responsive to one of said timing pulses of each group for causing the selection of the following pulse of that group of timing pulses, and means for varying the elapsed interval between the time of transmission of each of said first series of pulses and the time of occurrence of the selected timing pulses of the corresponding groups of timing pulses to bring said selected timing pulses into synchronism with said echo pulses.

7. The combination with means for generating and transmitting a first series of separated pulses of energy, of means for receiving from a distant object a series of pulses which are echoes of said transmitted pulses, a generator of alternately positive and negative timing pulses successive like pulses of which are separated by a predetermined fixed time interval, means for controlling said timing pulse generator to cause the generation of groups of timing pulses to be started in synchronism with the generation of the pulses of said first series of pulses and to cause the generation of each group of timing pulses to end before the next pulse of the first series is transmited, means responsive to one of said timing pulses of each group having a certain polarity for causing the selection of the following pulse of opposite polarity of that group, means for varying the time interval elapsing between said pulses of said first series and the selected pulses of the corresponding groups of timing pulses to bring the selected pulses into synchronism with said echo pulses, and means controlled in accordance with the setting of said last-mentioned means for indicating the range of the object.

LARNED A. MEACHAM.

REFERENCES CITED

The following references are of record in the file of this patent:

UNITED STATES PATENTS

| Number | Name | Date |
|---|---|---|
| 2,241,615 | Plebanski | May 13, 1941 |
| 2,332,253 | Peterson | Oct. 19, 1943 |
| 1,924,174 | Wolf | Aug. 29, 1933 |
| 2,189,549 | Hershberger | Feb. 6, 1940 |
| 2,255,839 | Wilson | Sept. 16, 1941 |
| 2,092,887 | Luck | Sept. 14, 1937 |
| 2,324,314 | Michel | July 13, 1943 |
| 1,592,274 | Kipping | July 13, 1926 |
| 2,318,197 | Clark | May 4, 1943 |

FOREIGN PATENTS

| Number | Country | Date |
|---|---|---|
| 552,072 | Great Britain | Mar. 22, 1943 |

Certificate of Correction

Patent No. 2,422,204.   June 17, 1947.

LARNED A. MEACHAM

It is hereby certified that errors appear in the above numbered patent requiring correction as follows: In the drawings Figs. 1A, 2, and 3 should appear as shown below instead of as in the patent—

FIG. 2 and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*